June 26, 1962   E. G. PATRICK   3,041,037
GATE VALVE ASSEMBLY
Filed July 28, 1958   2 Sheets-Sheet 1
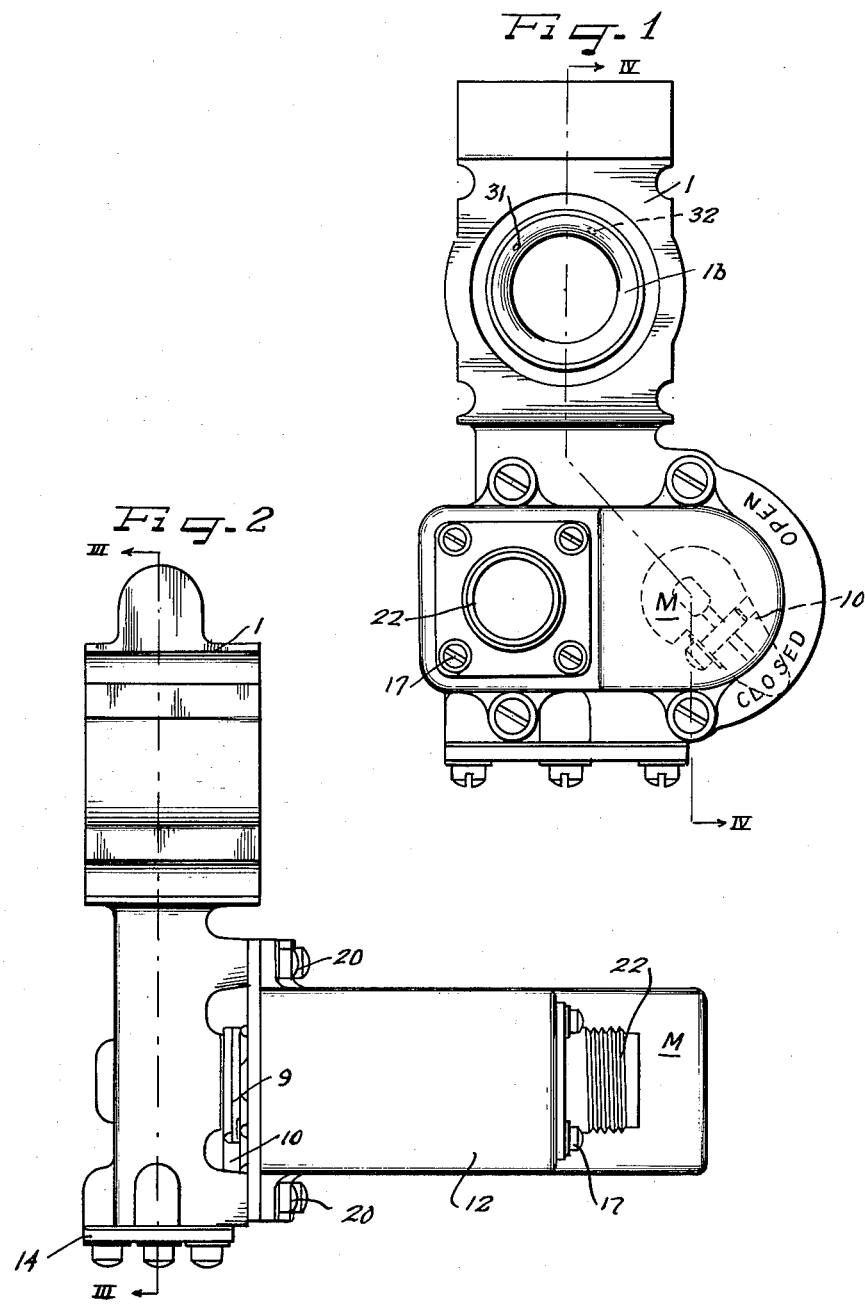
Inventor
Ernest G. Patrick
by Hill, Sherman, Meroni, Gross & Simpson Attys.

June 26, 1962 E. G. PATRICK 3,041,037
GATE VALVE ASSEMBLY
Filed July 28, 1958 2 Sheets-Sheet 2
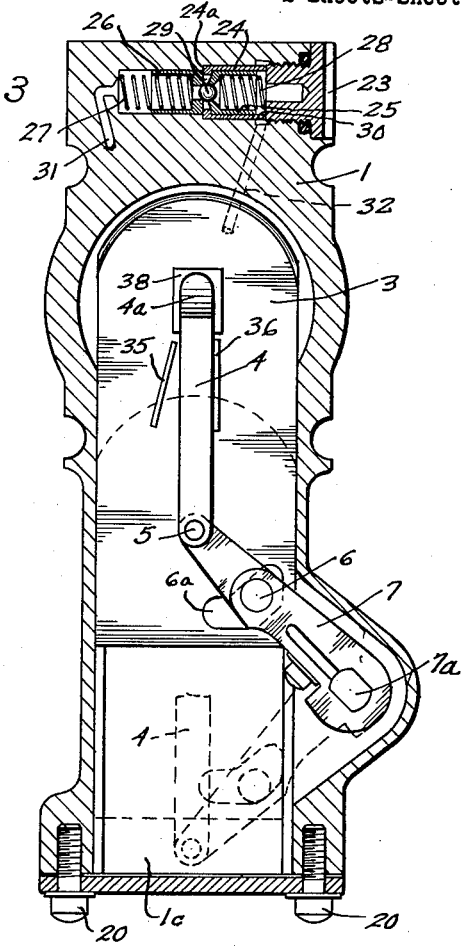
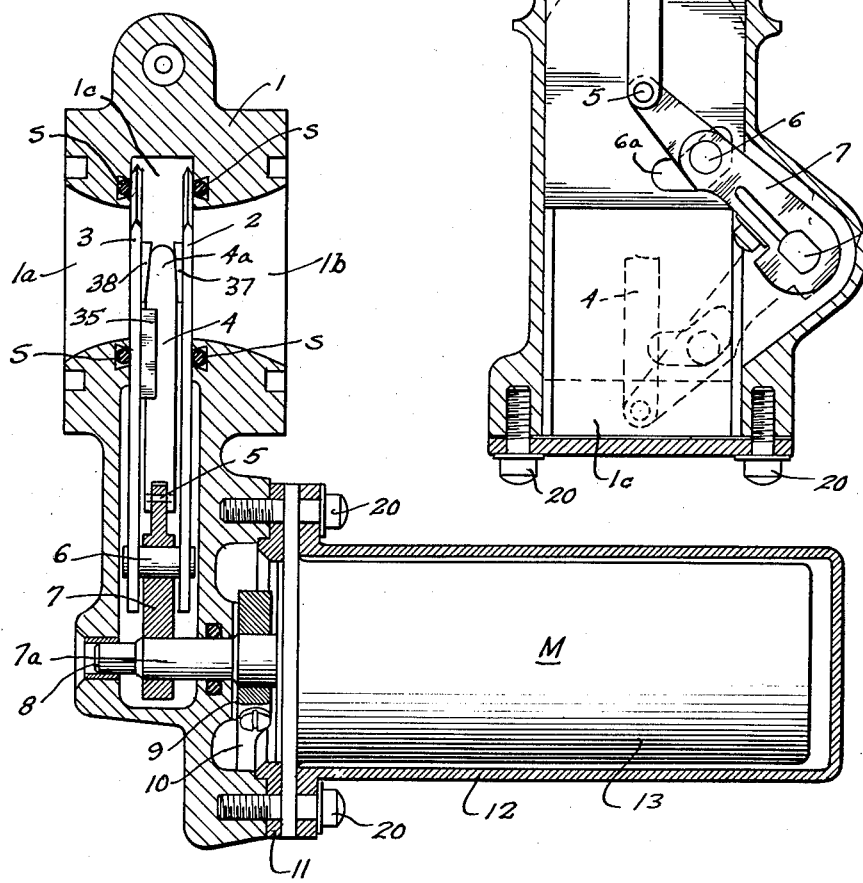
Inventor
Ernest G. Patrick

United States Patent Office 3,041,037
Patented June 26, 1962

3,041,037
GATE VALVE ASSEMBLY
Ernest G. Patrick, Bellflower, Calif., assignor to Thompson Ramo Wooldridge, Inc., a corporation of Ohio
Filed July 28, 1958, Ser. No. 751,440
2 Claims. (Cl. 251—195)

This invention relates to a gate valve assembly. More particularly, this invention relates to an improved three piece gate valve assembly which is particularly adapted to provide on-off and metering control for all types of aircraft fuels, oils and hydraulic fluids.

In currently used gate valves, especially those used in missiles and aircraft, the gate is similar to a flat plate which slides up and down between two resilient seals. The friction encountered in this arrangement is quite high and results in a high operating load. This in turn requires a larger than necessary electric motor if the valve is motor driven. Whether the valve is motor driven or manually operated, the result is additional weight. Also, some applications require a valve capable of operation at lower than usual motor voltages. With the high friction inherent in prior art valves, this requirement cannot be met.

It is therefore an object of this invention to provide a gate valve assembly the construction of which reduces the operating frictional load to a minimum thereby permitting the use of a smaller motor, lower operating voltages, and resulting in substantial weight reduction.

It is a further object of this invention to provide a three piece gate valve assembly in which an operating plunger is wedged between first and second plates to close the valve, the removal of the plunger permitting the plates to lose contact with their seal and hence substantially reduce the frictional forces.

It is a further object of this invention to provide a valve assembly in which the valve is closed by the wedging action of an operating plunger between two valve members.

Other objects, features, and advantages of the present invention will be more fully apparent from the following detailed description taken in connection with the accompanying drawings in which like reference characters are used to refer to like parts throughout and wherein:

FIGURE 1 is a front elevational view of the valve assembly.

FIGURE 2 is a side elevational view of the valve assembly.

FIGURE 3 is a sectional view taken on the line III—III of FIGURE 2.

FIGURE 4 is a sectional view taken on the line IV—IV of FIGURE 1.

Turning now to the drawings, there is shown a valve assembly including a valve body member 1 having an annular flow passage therein including an inlet 1a and an outlet 1b. While the terms inlet and outlet are used for convenience herein, it will of course be understood that the direction of flow of the fluid to be controlled by the gate valve is entirely reversible and that either side of the annular passage may in fact be considered the inlet the other side being the outlet.

The flow passage through the housing 1 is controlled by a gate comprising two generally flat plates 2 and 3 positioned in a chamber 1c in valve body, which extends transversely of the flow passage. A plunger 4 operates between the flat plates. Travel of the gate as an assembly is controlled by an arm 7 which is pivotally attached to the plunger 4 by a pin 5 and which works through an arc. Arm 7 has rigidly attached thereto a pin 6 which works in the slots 6a in the two flat plates 2 and 3 in such a fashion that the first few degrees of travel of the arm 7 releases the wedge effect of the plunger on the two flat plates thereby releasing any load on those two members and allowing them to collapse inwardly. The rest of the travel of the arm 7 in its arc of rotation about the shaft 7a of a motor M results in moving the two plates downwardly through action of the pin 6 so that a full open condition exists through the flow passage and fluid can pass through the valve.

To close the valve the reverse procedure is followed. That is to say, the arm 7 is moved through its arc until the two flat plates are in a closed position and with the last few degrees of movement of the arm the tapered surface or wedge part 4a of the plunger 4 is moved into position between wedge-shaped members 37 and 38 where it forces the two flat plates against their respective seals S. Seals S may conveniently be O-rings of any suitable resilient material. Travel of the plunger 4 is guided by flange members 35 and 36 projecting inwardly from plate 3. It is not necessary that the force applied to the plunger be any greater than that necessary to squeeze the resilient seals S so that a metal to metal condition exists. That is, in the closed condition each of the outward faces of the flat plates just touches the respective faces of the housing. Sealing is accomplished then by the squeeze of the resilient seals S.

In the preferred embodiment shown in the drawings, the arm 7 is driven by an electric motor M. The approximate 90° arc through which the arm travels may be governed either by two miniature limit switches (not shown) to control the electric motor, one cutting off the voltage at the open position of the gate the other at the closed position, or by any suitable conventional planetary gear clutch or magnetic clutch. It will be understood that the particular control means used depends upon the requirements of the particular application for which the gate valve is intended and does not form a part of the present invention. Alternatively, the gate valve can if desired be entirely manually operated. In the illustrative embodiment shown the shaft 7a of motor M is journaled in a bearing 8. The shaft 7a may be manually rotated through the action thereon of a thrust washer 9 and a manual override lever 10.

The motor M may conveniently comprise a motor assembly 13 mounted in a housing 12 which is attached to the housing 1 by any suitable means such as screws 20 and flange plate 11. A cover 14 may be provided for the base of the housing 1. An electrical receptacle 22 to which a cord or cable for supplying power to the motor may be attached is provided as shown and may be attached to the housing 12 by screws 17.

As best shown in FIGURE 3, the valve body member has a bore above the gate valve which is closed by a plug 23. This bore has a sleeve 24 held against a shoulder in the bore by the plug and slidably mounting a cup-shaped member or poppet valve 25. The sleeve 24 has an annular end flange 24a and the cup member 25 is adapted to be bottomed on this flange. A second cup member 26 is slidably mounted in the bore and is also adapted to bottom on the flange 24a in opposed relation to the bottom of the cup member 25. A spring 27 urges the cup member 26 against one face of the flange 24a and a second spring 28 urges the cup member 25 against the opposite face of the flange 24a.

A metal ball 29 is positioned between the cup members 25 and 26 and seats on the apertured end walls thereof to project partially into the apertures. The end of the bore in the housing or body 1 is connected at one end through a passage 31 with the outlet side 1b of the flow pasageway. A passageway 32 connects the other end of the bore with the inlet side 1a of the flow passageway. A rubber O-ring or the like seal is interposed between the plug 23 and the open end of the bore to seal the open end. The passageway 32 is joined to the interior of the cup 25 through a groove 32a and through openings in the end of sleeve 24.

The by-pass valve assembly is thus adapted to open in response to excessive pressures in either cup 25 or cup 26. For example, if the pressure in cup 25 becomes excessive the ball 29 will be forced off of its seat in the end of the cup 25 to vent the space between the two cups to pressure. The enlarged end face of the cup 26 when exposed to this end pressure will also be forced away from the ball 29 and the passageway 32 will be joined with the passageway 31. Conversely, when pressure in passageway 31 becomes excessive, it will force the ball member 29 off of the seat in cup 26 and will slide the cup 25 away from the stop 24a, thereby exposing the end face of the cup 25 to the excessive pressures and unseating the ball 29 to permit flow to the passageway 32.

As noted above, the plate or gate member 3 is provided with a pair of flange or guide members 35 and 36 which guide the travel of the operating plunger 4 when lever 7 moves in its arc. Further, each of the plates 2 and 3 is provided with wedge shaped members 37 and 38 respectively between which the tapered end 4a of the plunger 4 seats. The operation of the gate valve may be best seen from FIGURE 3 wherein arm 7, plunger 4, and gate 3 are shown in solid lines in their closed position and are shown in dotted lines in the open position.

When it is desired to open the gate valve, either the motor M is actuated or the manual lever 10 is moved to rotate the shaft 7a which in turn rotates the arm 7 in a counter-clockwise direction as seen in FIGURE 3. Rotation of the arm 7 moves the pin 6 downwardly in the slot 6a which in turn moves the plates 2 and 3 downwardly. During the first few degrees of motion of the arm 7, the pin 5 will pull the plunger 4 in a straight downward direction due to the shape of the slot 6a. This downward motion of the plunger 4 removes the tapered section 4a of the plunger from between the wedge members 37 and 38 on the plates 2 and 3 thus releasing the force applied to the plates by the plunger. The upstream plate 3 will immediately collapse inwardly thereby breaking all contact between plate 3 and the seal members S. Of course, plate 2 will be held against its seal by the fluid pressure until it has completed a sliding motion such that the top of the plate is beneath the top of the outlet 1b thereby permitting an equalization of pressure on the two sides of the plate. As the arm 7 continues its rotation, the pin 6 will continue to pull the plates downwardly, pin 6 moving outward in slot 6a as the arm swings through its arc, and the pin 5 will pull the plunger 4 downwardly also, the guide member 35 being slanted as shown in FIGURE 3 to permit plunger 4 to swing through an arc defined by the travel of the arm 7. As soon as plate 2 has cleared the top of the opening 1b, plate 2 will also collapse inwardly and the two plates will both move without any contact with the seal members, thereby eliminating any frictional forces due to this contact.

It will of course be realized that the travel of the arm 7 can be stopped at any point intermediate the fully closed position shown in solid lines in FIGURE 3 and the fully open position shown in dotted lines in FIGURE 3 thereby affording a metering action by controlling the size of the opening in the flow passage. When it is desired to close the valve from its fully open or partially open position, the arm 7 is rotated in a clockwise direction as shown in FIGURE 3 the pin 6 pushing the plates 2 and 3 upwardly and the pin 5 similarly urging the plunger 4 upwardly between the guide members 35 and 36. During most of this motion, the plates 2 and 3 will not be urged against the sealing members and therefore substantially no frictional forces will result from contact with the seals. After the plates have been moved upwardly into the closed position, the pin 6 rides in the upward projection of the slot 6a so that the pin 5 urges the plunger 4 upwardly after the motion of the plates 2 and 3 has stopped. This in turn forces the tapered portion 4a of the plunger 4 between the wedge members 37 and 38 and thereby urges the plates 2 and 3 against their respective seals S to complete the closing of the valve.

The fact that contact between the plates 2 and 3 and their respective sealing members S is eliminated during most of the travel of the plates in opening and closing the valve substantially reduces the horsepower required to operate a valve of any given size by comparison with that required to operate a valve of conventional construction. This in turn makes it possible to use a smaller motor to operate the valve than would be required for a conventional gate valve and further makes it possible to use a motor which operates at lower voltage ratings. Even if the valve is entirely manually operated, the operating mechanism can be of lighter weight construction and will afford easier operation since less force is required to move the valve. It will be understood that modifications and variations may be effected in the above disclosed exemplary preferred embodiment of the invention without departing from the spirit and scope of the novel concept of the present invention as defined by the following claims.

I claim as my invention:

1. A gate valve comprising, a valve body having a flow passage therethrough, a chamber in said valve body extending transversely of said flow passage, first and second resilient seal means mounted in said chamber around the intersections therewith of said flow passage, first and second gate members mounted for movement in said chamber into and out of said flow passage, each of said gate members comprising a generally flat plate, a lever arm, means fixedly secured to said lever arm at a first end thereof and mounting said lever arm in said chamber between said generally flat plate gate members, and effective to rotate said lever arm so that a second end thereof reciprocates in said chamber toward and away from said flow passage, a substantially L-shaped slot in each of said gate members, a pin projecting through said slots and being rigidly attached to said lever arm in spaced relation to said first and second ends of said lever arm to move said gate members into and out of closing position relative to said flow passage in response to movement of said lever arm, an operating plunger also positioned between said gate members and pivotally attached at one end to said second end of said lever arm, said operating plunger having its other end tapered, a wedge member on each of said gate members and first and second guide members mounted on one of said gate members, said guide members holding said operating plunger in a generally upward position, said wedge members coacting with said tapered end of said operating plunger to force said gate members against said seal means when said gate members are moved to their closed position by said lever arm and said gate members being freed to move out of contact with said seal means for a major portion of their travel when said valve is opened to eliminate friction between said seal means and said gate members in operating said valve.

2. A gate valve comprising a valve body having a flow passage therethrough, a chamber in said valve body extending transversely of said flow passage, first and second gate members mounted for movement in said chamber across said flow passage and to one side of said flow passage selectively, in a path perpendicular to the flow passage in said valve body, said first and second gate members forming first and second slots of L-shaped configuration, a lever arm, motor means for rotating said lever arm including a shaft connected to one end of said lever arm and disposing said lever arm between said first and second gate members, a pin on said lever arm spaced from said one end of said lever arm and from the other end of said lever arm, said pin projecting through said slots, said pin in said slots cooperating to move said gate members into and out of said flow passage in response to movement of said lever arm as actuated by said motor, said pin being spaced sufficiently from said one end of said lever arm for effecting said movement of said gate members into and out of said flow passage and said L-shaped slots being calibrated cooperatively to effect said movement without hindering the rotation of said lever arm, an operating plunger positioned between said gate members and pivotally connected to said lever arm at said other end of said lever arm, said motor means mounting said lever arm so that said other end of said lever arm reciprocates in said chamber during rotation of said lever arm for a greater distance than said pin whereby said operating plunger is reciprocated a greater distance than said gate members during rotation of said lever arm, and wedging means formed by said gate members and said plunger cooperatively, to force said gate members into sealing relationship with said valve body upon rotation of said lever arm in one direction and reciprocation of said gate members and plunger in a corresponding direction whereby to seal said passage against flow when said gate members are moved upwardly and when said plunger is wedged therebetween, said greater reciprocation of said plunger affording wedging action after seating of said gate members against said valve body and releasing the wedging action prior to movement of said gate members out of engagement with said valve body upon rotation of said lever arm away from said flow passage.

References Cited in the file of this patent

UNITED STATES PATENTS

| | | |
|---|---|---|
| 663,515 | Powell | Dec. 11, 1900 |
| 673,925 | Powell | May 14, 1901 |
| 2,351,312 | Allen | June 13, 1944 |
| 2,351,775 | McMurry | June 20, 1944 |
| 2,670,752 | Laurent | Mar. 2, 1954 |
| 2,718,372 | Broz | Sept. 20, 1955 |
| 2,866,253 | Wynn | Dec. 30, 1958 |